Oct. 31, 1939.  J. COLLON  2,177,865
LUG LOCKING LOCK WASHER
Filed March 7, 1938
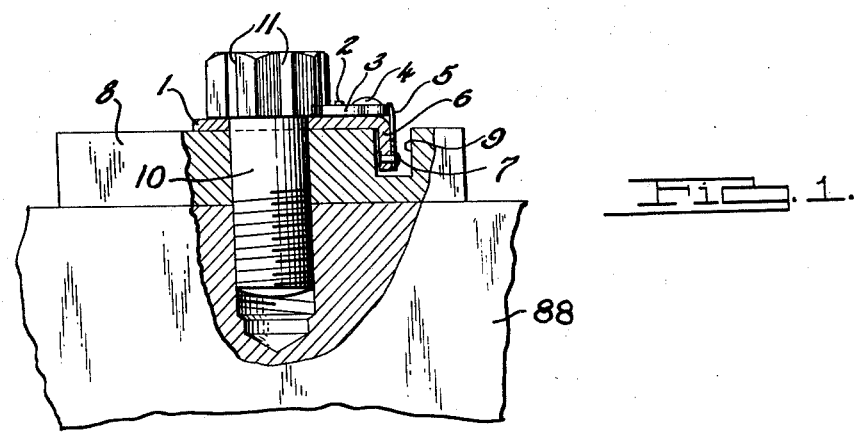
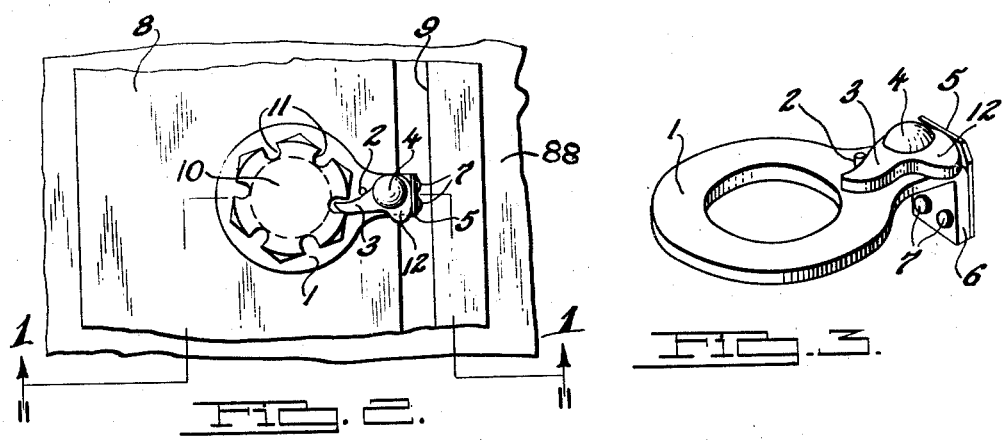
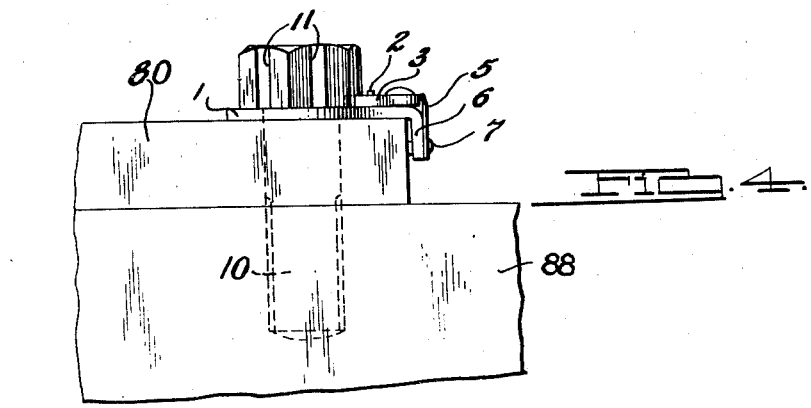
INVENTOR
Joseph Collon Patented Oct. 31, 1939

2,177,865

UNITED STATES PATENT OFFICE 2,177,865

LUG LOCKING LOCK WASHER

Joseph Collon, Pontiac, Mich.

Application March 7, 1938, Serial No. 194,317

2 Claims. (Cl. 151—48)

This invention relates to an improved lug locking jar proof lock washers for use where there are very heavy or rapid vibrations.

One object of the invention is to provide a lock washer that will not break loose its grip and allow a bolt, nut or stud held thereby to work loose as in the case of many of the common types of lock washers now in use.

Another object of the invention is to provide positive means for permanently holding a bolt or nut secure against turning which will not break loose under strain or vibration and which will not gouge the part against which it is tightened.

A further object of the invention is to provide a lock washer adapted to positively hold a nut or bolt against turning having a locking lug which is constantly urged into engagement with suitable axially disposed recesses formed in the head of a machine bolt, nut or stud, the said locking lug being arranged to be positioned free of the bolt, nut or stud locked thereby when the said bolt, nut or stud is being removed.

Other objects, features and advantages of the invention will become apparent by reference to the following description taken in connection with the accompanying drawing, in which:

Fig. 1 is a vertical sectional view taken on the line 1—1 of Fig. 2 showing a lock washer embodying the invention holding a machine bolt fixed in its tightened position against a flat surface.

Fig. 2 is a top plan view of the construction shown in Fig. 1.

Fig. 3 is a perspective view of the lock washer disclosed in Figs. 1 and 2.

Fig. 4 is an elevational view showing the lock washer shown in Fig. 3 in use on a machine bolt located adjacent the edge of a piece of work secured to a second work piece by the said machine bolt.

Referring now to the drawing wherein like numerals refer to like and corresponding parts throughout the several views, the flat apertured portion of the novel lock washer is designated by numeral 1 and has an improved self-positioning locking lug 3 pivoted thereon by means of a rivet 4. The said locking lug 3 is shown throughout the several views of the drawing in a fully locked position resting against a stop of pin 2. The object of stop 2 is to prevent locking lug 3 from moving clockwise beyond its fully locked position when the bolt 10 becomes loose and tends to turn counterclockwise.

The flat portion 1 of the lock washer has a downwardly disposed tongue 6 preferably formed integral therewith at one side thereof onto which a flat steel leaf type spring 5 is secured by such suitable means as the rivets 7. The said leaf spring 5 contacts the flat portion of the cam 12 formed on the locking lug 3 and constantly urges the said locking lug 3 into engagement with the head of the machine bolt 10 at axially disposed recesses or flutes 11 cut in the head thereof.

Obviously, when the locking lug 3 is turned counterclockwise slightly more than 45 degrees, the cam 12 formed thereon in engagement with the spring 5 causes the said locking lug 3 to snap into an open position 90 degrees counterclockwise with respect to the position of the said locking lug 3 shown in Figs. 2 and 3. Thus, the novel lock washer disclosed herein may be completely released manually from its locked position to admit of the removal of the machine bolt 10 without interference therefrom.

When the locking lug 3 is turned less than 45 degrees counterclockwise from the position shown in Figs. 2 and 3 the pressure of tension spring 5 against the cam 12 thereof constantly urges the said locking lug 3 into locking engagement with the head of the machine bolt 10 at a slotted recess 11 therein.

The work piece 8 which is secured to the second work piece 88 by the machine bolt 10 is provided with a suitable groove, slot or depression 9 into which the downwardly disposed tongue 6 of the flat portion 1 of the novel lock washer depends for the purpose of preventing the said lock washer from turning while the bolt head of the bolt 10 is being tightened or when the bolt 10 tends to loosen when subjected to vibration or the like.

The operation of the novel lock washer disclosed in Fig. 3 is obvious as shown in detail in Figs. 1 and 2 wherein work pieces 8 and 88 are secured together by a machine bolt 10 which is provided with suitable axially disposed recesses or flutes 11 preferably formed in the flat sides of the head thereof. Fig. 4 shows how the novel lock washer is used in connection with a machine bolt 10 which secures work pieces 80 and 88 together, the edge of the work piece 80 taking the place of the groove, slot or depression 9 provided in the work piece 8 shown in Fig. 2.

Although the invention has been disclosed in the drawing and described in detail with reference to a head of a machine bolt, obviously, the head of a nut or the upper periphery of a headed stud may be fluted and locked in place with the novel lock washer construction disclosed herein. Any standard form of bolt, nut or headed stud may be used with the novel lock washer disclosed herein by providing the head thereof with a plurality of axially disposed flutes substantially as indicated in the drawing.

Although but one embodiment of the invention has been disclosed and described herein, it is to be understood that many changes including the size, shape, arrangement and detail of the various parts thereof may be made without departing from the spirit of the invention, and it is not intended to limit the scope of the invention other than by the terms of the appended claims.

I claim:

1. A locking device including a threaded member adapted to secure work pieces together having axially disposed slotted recesses spaced around the periphery thereof, a lock washer engageable between said threaded member and one work piece, a tongue depending from the said lock washer adapted to engage one of said work pieces and prevent the turning of the said lock washer when the said threaded member is turned, a locking lug pivoted on the said lock washer, a cam formed integral with said locking lug, a stop extending above said lock washer located to limit the pivotal movement of the locking lug toward its locked position, spring means secured to the said depending tongue adapted to engage the cam of the said locking lug and constantly urge the said locking lug toward its locked position against the said threaded member wherein the said locking lug permits the said threaded member to be turned in one direction and locks the said threaded member from turning in the opposite direction by engaging the said threaded member at the said recesses formed therein.

2. A locking device including a threaded member adapted to secure work pieces together having axially disposed slotted recesses spaced around the periphery thereof, a lock washer engageable between said threaded member and one work piece, a tongue depending from the said lock washer adapted to engage one of said work pieces and prevent the turning of the said lock washer when the said threaded member is turned, a locking lug pivoted on the said lock washer, a cam formed integral with said locking lug, a stop extending above said lock washer located to limit the pivotal movement of the locking lug toward its locked position, spring means secured to the said depending tongue adapted to engage the cam of the said locking lug and constantly urge the said locking lug toward its locked position against the said threaded member wherein the said locking lug permits the said threaded member to be turned in one direction and locks the said threaded member from turning in the opposite direction by engaging the said threaded member at the said recesses formed therein, the said cam of the locking lug being so formed as to permit the said locking lug to be retained by said spring out of contact with said threaded member when said locking lug is turned manually away from said stop completely out of engagement with the said threaded member.

JOSEPH COLLON.